United States Patent
Lösch

(10) Patent No.: US 6,801,684 B2
(45) Date of Patent: Oct. 5, 2004

(54) OPTICAL SWITCH FABRIC FOR INDIVIDUALLY SWITCHING OPTICAL PATHS FOR OPTICAL SIGNALS BETWEEN INPUT AND OUTPUT PORTS

(75) Inventor: Kurt Lösch, Stuttgart (DE)

(73) Assignee: Alcatel, Paris (FR)

(*) Notice: Subject to any disclaimer, the term of this patent is extended or adjusted under 35 U.S.C. 154(b) by 17 days.

(21) Appl. No.: 10/401,537

(22) Filed: Mar. 31, 2003

(65) Prior Publication Data

US 2003/0194173 A1 Oct. 16, 2003

(30) Foreign Application Priority Data

Apr. 15, 2002 (EP) ............................................. 02360121

(51) Int. Cl.⁷ ............................. G02B 6/26; G02B 6/42; G02B 6/28
(52) U.S. Cl. ............................. 385/18; 385/15; 385/16; 385/17; 385/24; 398/50; 398/56
(58) Field of Search .............................. 385/15, 16, 17, 385/18, 24; 398/50, 56; 359/290

(56) References Cited

U.S. PATENT DOCUMENTS

| | | |
|---|---|---|
| 6,243,507 B1 | 6/2001 | Goldstein et al. |
| 6,320,993 B1 | 11/2001 | Laor |
| 6,337,760 B1 | 1/2002 | Huibers et al. |
| 2002/0093720 A1 * | 7/2002 | Hichwa et al. ............. 359/290 |
| 2002/0191895 A1 * | 12/2002 | Hatam-Tabrizi ............. 385/16 |

FOREIGN PATENT DOCUMENTS

| | | |
|---|---|---|
| WO | WO 01/75710 A2 | 12/2000 |
| WO | WO 01/77735 A2 | 10/2001 |

* cited by examiner

*Primary Examiner*—John R. Lee
*Assistant Examiner*—Mary El-Shammaa
(74) *Attorney, Agent, or Firm*—Sughrue Mion, PLLC

(57) ABSTRACT

The invention relates to an optical switch fabric comprising at least one micro mirror array with tilting micro mirrors for individually switching optical paths for optical signals between input and output ports, especially fibers or waveguides gathered in at least one fiber arrays, comprising a beam splitter and a detector array, wherein the beam splitter is adjusted to partly reflect the optical signals reflecting from the mirrors of said at least one micro mirror array to said detector array and micro mirror control means, that are realised such, that a control signal is generated out of a feedback signal of said a detector array to correct the angular positions of the micro mirror and a method therefore.

5 Claims, 2 Drawing Sheets

OPTICAL SWITCH FABRIC FOR INDIVIDUALLY SWITCHING OPTICAL PATHS FOR OPTICAL SIGNALS BETWEEN INPUT AND OUTPUT PORTS

BACKGROUND OF THE INVENTION

The invention is based on a priority application EP 02360121.4 which is hereby incorporated by reference.

The invention relates to an optical switch fabric comprising at least one micro mirror array with tilting micro mirrors for individually switching optical paths for optical signals between input and output ports, especially between fibres or waveguides gathered in at least one fibre array.

Optical switches, for so-called optical cross connects or optical patch panels, based on a free space three dimensional micro mechanical mirror architecture work by tilting said micro mirrors to establish optical paths between input ports to selected output ports. In a so-called z-type architecture, an array of input fibers or waveguides each with a collimator lens (often called collimated fibres) is aligned such, that each of the optical input signals falls onto a corresponding micro mirror element of a first set of mirrors, arranged in a first mirror array, that can direct the incident light rays by tilting the mirrors around two axes. A second array of collimated output fibers or waveguides is aligned to a second set of mirrors, arranged in a second mirror array. By precisely tilting the corresponding pair of mirrors, the light ray of an arbitrary input fibre can be directed to a selected output fibre establishing a corresponding optical path.

An alternative architecture of an optical switch using micro mirrors comprises only one array of mixed collimated input and output fibres, one set of micro mirrors and a fixed auxiliary mirror. The light ray from an arbitrary input fibre is directed to a corresponding micro mirror. Said micro mirror is tilted such, that it reflects the received light via the auxiliary mirror to a selected further micro mirror, that is tilted to reflect said light back to the corresponding output fibre.

To achieve and maintain high coupling efficiency between input and output fibres, regardless of changes in the environmental conditions, e.g. temperature change of the mirror chip or ageing, the optical connections, i.e. the optical paths between input fibres, mirrors and output fibres, should remain extremely stable over a long period of time. Thus, the angular positions (or angles) of the mirrors must be controlled to maintain optimal optical connections.

One prior art solution for a control of mirror positions concerns a method of tapping signal light from each output fibre for supervision of the actual transfer behavior of the optical switching unit or switch fabric. However, this solution results in a very bulky and costly arrangement, as to tap the light of each output fibre, for each of said output fibre a corresponding power splitter and an individual detector must be provided. Furthermore, this method does not allow any precise control of the focal points or spots of the light signals at the corresponding fibre interfaces or micro mirror array.

An alternative prior art solution for a control of mirror positions concerns the use of capacitance sensors for determining the actual angular positions of the mirrors. However, this method does not give any feedback of the position of said focal points; therefore deviations from the optical path can not be observed and corrected.

SUMMARY OF THE INVENTION

The object of the invention is to disclose an optical switch fabric and a corresponding control method to precisely control the optical elements of the switch fabric for maintaining high coupling efficiency between input and output fibres (or waveguides) regardless of environmental influences and without any need for tapping light from an output fibre.

The basic idea of the invention is to control the tilting mirrors of a micro mirror array of an optical switch fabric for individually switching optical signals between input and output ports, e.g. consisting of fibre ends gathered either in a combined fibre array or in separated fibre arrays, such, that the position of the signal light spots onto the optical targets of said micro mirrors, either further micro mirrors or collimating lenses of corresponding output fibres, are observed by realising an exact optical image onto an observation or detector array. Said optical image is realised by a beam splitter adjusted to partly reflect the optical signals coming from micro mirrors to be controlled. A control signal is generated to correct the angular positions of said micro mirrors to couple exactly the corresponding input and output ports. To achieve a correct optical alignment of the optical unites, i.e. mirrors, beam splitters and fibre array(s), an optical control signal is transmitted from an input fibre to an output fibre, each the intensity of the reflected parts of said control signal by the beam splitters and the intensity of the remaining part not reflected by the beam splitters is detected, and second feedback signals out from said detected intensities are generated each to control the positions of the mirrors and the fibre array(s) to each other.

BRIEF DESCRIPTION OF THE DRAWINGS

Further developments of the invention can be gathered from the dependent claims and the following description.

In the following the invention will be explained further making reference to the attached drawings in which:

FIG. 1 schematically shows an exemplary z-type arrangement of an optical switch fabric OS with an input fibre array IFA showing N×M input fibres or fibre ends with collimating lenses, a first optical emitter E1, a first micro mirror array AR1 comprising N×M micro mirrors, a first beam splitter BS1, a first detector array DAR1, a first detector D1, a second micro mirror array AR2 comprising too N×M micro mirrors, a second beam splitter BS2, a second detector array DAR2, a second detector D2, an output fibre array OFA showing N×M output fibres with collimating lenses and a third detector D3. Further a first control unit CU1 and a second control unit CU2 is shown, with each an electrical input connected to the first detector array DAR1 respectively the second detector array DAR2 and each an electrical control output connected to the first micro mirror array AR1 respectively the second micro mirror array AR2. For each optical path a first feedback signal DS1 is send from the first detector array DAR1 to the first control unit CU1 and a first control signal CS1 is send from said control unit CU1 to said micro mirror array AR1 over the corresponding electrical connections. Similarly, a second feedback signal DS2 is send from the second detector array DAR2 to the second control unit CU2 and a second control signal CS2 is send from said control unit CU2 to said micro mirror array AR2.

Figure 1:
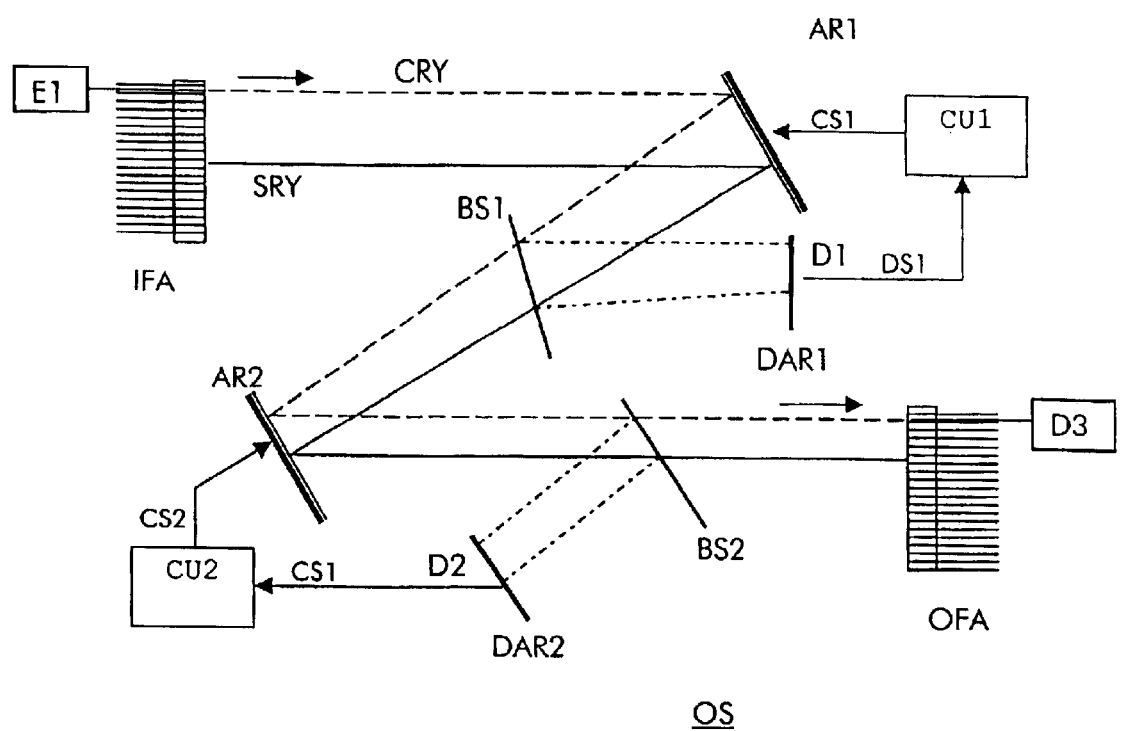
FIG. 1 shows an exemplary arrangement of an optical switch fabric according the invention for execution of a method according to the invention.

Each input fiber or waveguide, or, in general, each input port carries a light signal, that, after passing a corresponding collimating lens, is reflected by one corresponding micro mirror of the first micro mirror array AR1 to just one selected micro mirror of the second micro mirror array AR2 further reflecting said control ray CRY to one collimating lens of a corresponding output fibre of the output fibre array OFA. Thus, an optical connection between an input fibre and a selected output fibre is established by aligning the corresponding mirror of the first micro mirror array AR1 and the corresponding mirror of the second micro mirror array AR2. Additionally to the path of one control signal ray CRY described later in the description, the optical path of one signal light ray SRY of the N×M signal light rays is depicted in FIG. 1 by way of example.

The first beam splitter BS1 is a semi permeable mirror reflecting one minor part of the irradiated light rays to the first detector array DAR1 and letting through the other (main) part of light intensity. The second beam splitter BS2 reflects another minor part of each of the in-coming light rays, coming from mirror AR2, to the second detector array DAR2. The detector arrays DAR1 and DAR2 may be realised with each a collimator lens array or without any collimating optics.

The first emitter E1 emits a control signal or control ray CRY into one input fibre of said input fibre array IFA. Similarly to the signal ray SRY described above, said control ray CRY is reflected by the corresponding micro mirror of the first micro mirror array AR1 to a selected micro mirror of the second micro mirror array AR2 reflecting said control ray to the corresponding output fibre of the output fibre array OFA. The first beam splitter BS1 reflects one part of said light ray CRY to the first detector D1. The second beam splitter BS2 reflects one part of said light ray CRY to the second detector D2. At the output fibre array OPA, said light ray is detected in the third detector D3.

The control light ray CRY sent out by the first light emitter E1 and captured by the detector D3 and one element of each of the detector arrays DAR1, DAR2 is used to detect and fix the desired relative positions of the optical elements of the optical switch fabric OS, i.e. to align the input fibre array IFA, the beam splitters BS1 and BS2 and the output fibre array OFA and the micro mirror arrays AR1. This is achieved by aligning the beam splitters in such a way, that each the reflected parts of the control light ray CRY irradiates exactly on the corresponding first detector D1 and the second detector D2 respectively, and the output fibre array is aligned such, that the fibre connected to the third detector D3 is exactly hit, i.e. the intensity of each the irradiated light is maximum on each of said detectors D1, D2 and D3.

An active control loop not shown in FIG. 1 is used to control the relative positions of the input fibre array IFA, the beam splitters BS1 and BS2 and the output fibre array OFA in order to maintain this maximum condition regardless of changes of relative positions of said devices by thermal variations, e.g. using piezoelectric transducers. The first and the second detector D1 and D2 may be separate optical devices or realised by one element in the corresponding first and second detector arrays DAR1 and DAR2.

The control of said positions is performed either continuously by means of continuously sending a control light ray CRY on a reserved input fibre to the corresponding reserved output fibre. Alternatively a supervision of said positions takes place only in certain time intervals. The control ray in each time interval then only needs to be send for short time periods, that are necessary to supervise and control said positions.

When the intensity received by all the three detectors D1, D2 and D3 is maximum, it is sure that the control light path is correctly adjusted. Consequently, the beam splitters BS1 and BS2 give each an exact images of the signal light irradiated on the second micro mirror array AR2 and the output fibre array OFA respectively.

The light spot of the partly reflected signal ray SRY on the first detector array DAR1 thus gives an exact information about the angular position of the corresponding micro mirror of the first micro mirror array AR1 and consequently the exact position of the transmitted part of this signal ray SRY on the second micro mirror array AR2.

The same principle applies for the second part of the arrangement, i.e. second detector array DAR2 detects the angular position of the corresponding micro mirror on the second micro mirror array AR2 and consequently the position of the beam spot of said signal ray SRY at the output ports. The above principle explained for the signal ray SRY applies for each of the N×M signal light rays.

The first feedback signal DS1 sent by the first detector array DAR1 reports the actual light spot positions of the irradiated signal rays SRY to the first control unit CU1. Out of these actual spot positions and stored desired positions, the first control unit CU1 generates the control signal CS1 to align each mirror of the first micro mirror array AR1 such, that the difference between desired and actual spot positions disappear. A similar process is carried out by the second control unit CU2 to control the positions of the mirrors of the second micro mirror array AR2 by means of the second control signal CS2.

Thus, all optical paths are fully controlled to guarantee an optimal optical coupling between input fibres and output fibres.

Depending on the wavelengths of the transmitted optical signals the detector array DAR1 or DAR2 can be made from individual detectors or realised as so-called Charge Coupled Device (CCD), consisting of an array of light-sensitive photocells or pixels. CCD arrays of more that 2.000.000 pixels are used today in commercial digital cam recorders or cameras.

The maximum number N×M of optical fibers arranged in an fibre array IFA or OFA today is in the order of t 600. Thus, the position resolution of an above CCD array is fairly good enough to derive exact position values of received light spots. If arrays of detectors are used, the number of elements has to equal or higher to the number of optical paths plus 1 for the control path to get individual feedback signals for each path. Each element may be realised as quadrant detector allowing exact tracking of the actual spot position.

Figure 2:
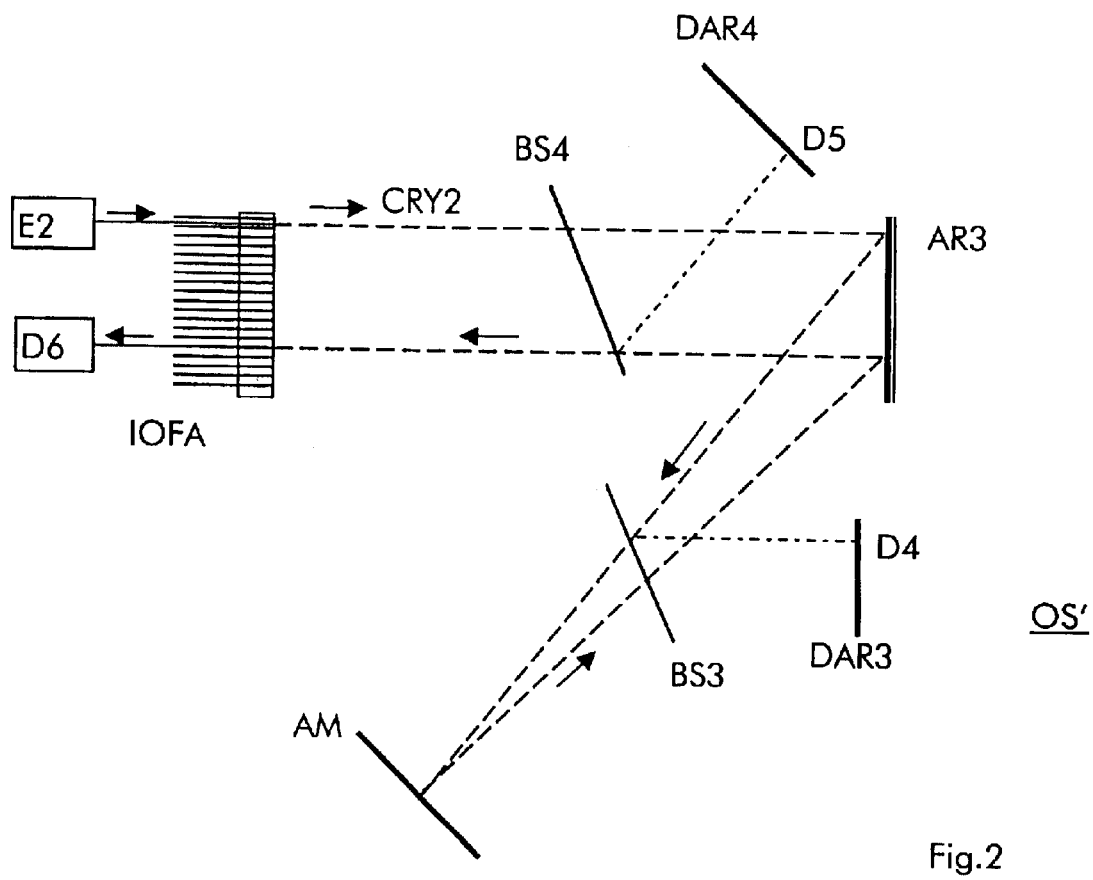
FIG. 2 shows an alternative exemplary arrangement of an optical switch fabric according the invention and FIG. 3 schematically illustrates a method according to the invention to avoid crass talks during switching periods.

FIG. 2 schematically shows an arrangement of an alternative optical switch fabric OS' with an combined input and output fibre array IOFA showing N×M input or output fibres with collimating lenses, a second optical emitter E2, a third micro mirror array AR3 comprising N×M micro mirrors, a third beam splitter BS3, a third detector array DAR3, a fixed auxiliary mirror AM, a fourth detector D4, a fourth micro mirror array AR4, a fourth beam splitter BS4, a fourth detector array DAR4, a fifth detector D5 and a sixth detector D6.

Similarly to FIG. 1, each input fiber carry a light signal to be switched to each one output fibre. By way of example, only the optical path of one light ray, i.e. the second control ray CRY2 is depicted in FIG. 2. Differently to FIG. 1, the input and output fibres are combined into one fibre array IOFA. The light rays from the input fibres, one half of the number of fibres of the combined fibre array IOFA, are individually reflected by one corresponding micro mirror of the third micro mirror array AR3 to the auxiliary mirror AM.

Said auxiliary mirror AM reflects the irradiated light signals back to each selected micro mirrors of the same third micro mirror array AR3 each reflecting said light rays to one corresponding output fibre. Thus, an optical connection between an input fibre and a selected output fibre is established by aligning the corresponding pair of mirrors of the third micro mirror array AR3.

The third beam splitter BS3, similarly to the first beam splitter BS1 of FIG. 1 reflects one part of the irradiated light rays to the third detector array DAR3 and letting through the other part of light intensity. The fourth beam splitter BS4 reflects one part of the irradiated light rays to the fourth detector array DAR4.

The second emitter E2 emits said second control ray CRY2 into one input fibre of said combined input and output fibre array IOFA. Said control ray CRY2 is reflected by the corresponding micro mirror of the third micro mirror array AR3 over the auxiliary mirror to a selected micro mirror of the same micro mirror array AR3 and then reflected to the corresponding output fibre. The third beam splitter BS3 reflects one part of said light ray CRY2 to the fourth detector D4. Further, the fourth beam splitter BS4 reflects one part of the received light ray CRY2 to the fifth detector D5. At the terminating control output fibre, said light ray is captured by the sixth detector D6.

In a similar way to FIG. 1, the second control light ray CRY2 sent out by the second light emitter E2 is used to fix the relative position of the fibre array IOFA and the beam splitters BS3 and BS4 by aligning the beam splitters in such a way, that said control light ray CRY 2 irradiates with a maximum intensity on each the three detectors D4, D5 and D6.

An active control loop not shown in FIG. 2 is used to maintain this maximum condition regardless of changes of relative positions of said devices by thermal variations.

When the intensity received by all the three detectors D1, D2 and D3 is maximum, it is sure that the control light path is correctly adjusted and that the beam splitters BS3 and BS4 give each an exact images of the signal light irradiated on the third micro mirror array AR3 and the fibre array IOFA respectively.

In a similar way regarding FIG. 1, the mirror positions of the micro mirrors can be controlled to guarantee maximum quality optical connections between the switched input and output fibres by corresponding control elements not shown in here.

Figure 3:
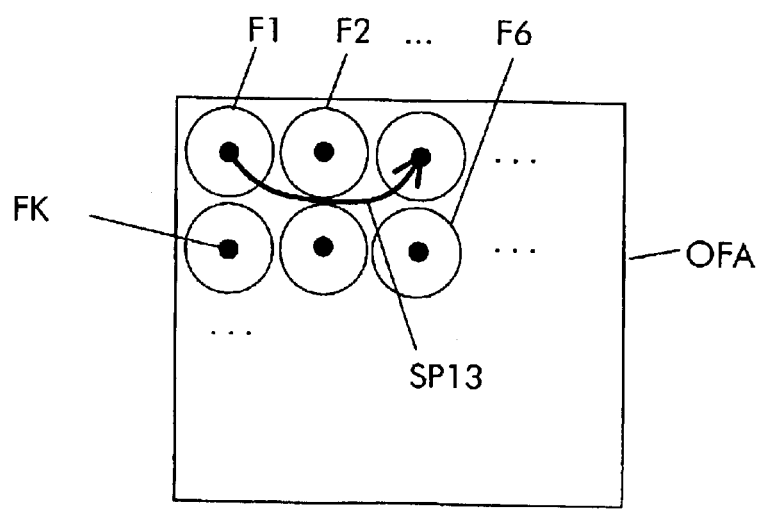

To avoid any cross talk during switching, is must be strictly avoided, that a corresponding light spot, switched from one port to another port, irradiates into a non selected port during the switching period. FIG. 3 schematically illustrates a method according to the invention to avoid cross talk during switching periods, by way of example for the first optical switch fabric OS. FIG. 3 shows the output fibre array OFA comprising a number of output fibres of which six fibre ends F1–F6 are shown by way of example. Said output fibre array OFA is shown in frontal view from a viewpoint behind the collimating lenses. The fibre ends F1–F6, e.g. showing a diameter of about 125 $\mu$m, are relatively dense packed. Each of said fibre end shows a fibre core FC, e.g. with a diameter of about 10 $\mu$m. Further an arrow SP13 starting at the core of the first fibre F1 and ending at the core of the third fibre F3 going around the core of the second fibre F2 (and all other cores in general) is shown, symbolising an exemplary light spot movement during a switching period of one selected signal ray.

The detector array DAR2 gives an exact image of the light spots irradiated onto the output fibre array OFA. Thus, a spot movement from the starting fibre core to the final fibre core can be exactly observed. The corresponding micro mirror movement is controlled to avoid any irradiation into other fibre cores by the corresponding control unit CU2.

The same principle applies for the control of the corresponding light spot movement on the second micro mirror AR2. As the first detector array DAR1 gives an exact image of the light spots irradiated onto the second micro mirror array AR2, each spot movement can be observed and controlled. A spot movement is controlled such, that hitting any intermediate mirror on said second micro mirror array AR2 is avoided.

This concept enables any arbitrary path to be programmed during the movement from a start position, i.e. the core of the first fibre F1 in the example shown in FIG. 3, to a destination position, i.e. the core of the third fibre F3 in said example. Thus hitting sensible regions, e.g. other than the destination fibre core or micro mirror, during movement of a light ray is avoided by real time control of the movement of the involved micro mirrors.

What is claimed is:

1. An optical switch fabric comprising two mirrors, at least one of said mirrors being a micro mirror array with tilting micro mirrors for individually switching optical paths for optical signals between input and output ports, especially between fibres or waveguides gathered in at least one fibre array, with two beam splitters and each one detector array associated, wherein the beam splitters are positioned such, that they partly reflect the optical signals, after being reflected by corresponding micro mirrors, to the associated detector array, with the following means for optimising the optical behaviour of the switch fabric:

micro mirror control means for generating first feedback signals out of the corresponding detector array to correct the corresponding angular positions of said micro mirrors and alignment means for aligning the mirrors and the at least one fibre array to each other, comprising signal sending means for sending a control signal from one input fibre to one output fibre, detecting means for detecting each the intensity of said reflected parts of said control signal and for detecting the intensity of the remaining part not reflected by the beam splitters, that irradiates to said output fibre and control means to generate second feedback signals out from said detected intensities.

2. An optical switch fabric according to claim 1, wherein the arrangement of optical elements is of a z-type with one input fibre array, one output fibre array, a first micro mirror array and a second micro mirror array, that are aligned such, that the optical signals irradiate from the input fibres to each a corresponding mirror of the first micro mirror array, that further reflects said optical signals to each a selected mirror of the second micro mirror array, that further reflects said signals to corresponding output fibres, wherein a first beam splitter is comprised, that is aligned to partly reflect the optical signals between the first and the second micro mirror array to a first detector array and a second beam splitter is comprised, that is aligned to partly reflect the optical signals between the second micro mirror array and the output fibres to a second detector array and wherein first control means are realised to control the micro mirrors of the first micro mirror array out of the feedback signals of the first detector array and second control means are realised to control the micro mirrors of the second micro mirror array out of the feedback signals of the second detector array.

3. An optical switch fabric according to claim 1, wherein one combined input and output fibre array, one micro mirror array and one auxiliary mirror are comprised, that are aligned such, that the optical signals irradiate from the input fibres to each a corresponding mirror of the micro mirror array, that further reflect said optical signals over the auxiliary mirror back to each a further selected mirror of said micro mirror array, that further reflect said signals to corresponding output fibres, wherein a first beam splitter is comprised, that is aligned to partly reflect the optical signals irradiating from the auxiliary mirror in direction to the micro mirror array to a first detector array and a second beam splitter is comprised, that is aligned to partly reflect the optical signals irradiating from the micro mirror array in direction to the output fibres to a second detector array and wherein the micro mirror control means are realised such, out of feedback signals of the first detector array, those micro mirrors are controlled, that receive optical signals from the input fibres, and out of feedback signals of the second detector array those micro mirrors receiving are controlled, that reflect optical signals from the auxiliary mirror to irradiate to output fibres.

4. An optical switch fabric according to claim 1, wherein, for avoiding cross talk between different light channels, the micro mirror control means are realised such, that a light signal to be switched from one port to selected port is moved on a defined way without irradiating into any other port.

5. A method for controlling an optical switch fabric comprising two mirrors, at least one of said mirrors consisting of a micro mirror array with tilting micro mirrors for individually switching optical paths for optical signals between input and output ports, especially between fibres or waveguides gathered in at least one fibre array, with two beam splitters and each one detector array associated, wherein the beam splitters are positioned such, that they partly reflect the optical signals, after being reflected by corresponding micro mirrors, to the associated detector array, with the following means for optimising the optical behaviour of the switch fabric:

generating first feedback signals out of the corresponding detector array to correct the corresponding angular positions of said micro mirrors and transmitting an optical control signal from an input fibre to an output fibre, detecting each the intensity of the reflected parts of said control signal by the beam splitters and the intensity of the remaining part not reflected by the beam splitters, and generating second feedback signals out from said detected intensities for aligning the mirrors and the at least one fibre array to each other.

\* \* \* \* \*